United States Patent [19]
Capbern et al.

[11] Patent Number: 5,474,265
[45] Date of Patent: Dec. 12, 1995

[54] RIGID KRUGER NOSE FOR THE LEADING EDGE OF AN AIRCRAFT WING

[75] Inventors: Patrick Capbern, Cornebarrieu; Jérôme; Charieras, Toulouse; Pascal Chaumel, Plaisance du Touch, all of France

[73] Assignee: Societe Nationale Industrielle et Aerospatiale, Paris, France

[21] Appl. No.: 126,708

[22] Filed: Sep. 24, 1993

[30]     Foreign Application Priority Data

Sep. 24, 1992 [FR] France ................... 92 11405

[51] Int. Cl.⁶ ................ B64C 3/50; B64C 3/54
[52] U.S. Cl. ...................... 244/214; 244/219
[58] Field of Search ...................... 244/210, 213, 244/214, 217, 219

[56]          References Cited

U.S. PATENT DOCUMENTS

| | | | |
|---|---|---|---|
| 3,195,836 | 7/1965 | Alvarez-Calderon | 244/210 |
| 3,363,859 | 1/1968 | Watts | 244/210 |
| 3,556,439 | 1/1971 | Autry | 244/210 |
| 3,743,219 | 7/1973 | Gorges | 244/210 |
| 3,910,530 | 10/1975 | James et al. | 244/214 |
| 3,917,192 | 11/1975 | Alvarez-Calderon | 244/214 |
| 3,941,334 | 3/1976 | Cole | 244/214 |
| 3,949,957 | 4/1976 | Portier | 244/214 |
| 4,159,089 | 6/1979 | Cole | 244/214 |
| 4,189,121 | 2/1980 | Harper et al. | 244/214 |
| 4,915,327 | 4/1990 | Ellmers et al. | 244/210 |
| 5,158,252 | 10/1992 | Sakurai . | |

FOREIGN PATENT DOCUMENTS

2355723  5/1975  Germany ................... 244/214

*Primary Examiner*—Andres Kashnikow
*Assistant Examiner*—Virna Lissi Mojica
*Attorney, Agent, or Firm*—Michael N. Meller

[57]          ABSTRACT

The leading edge (12) of an aircraft wing is equipped with a krüger nose which includes a rigid flap (18) and a mechanism (26,28,30,40) ensuring the deployment of the flap in an intermediate landing position (P3) and in a take-off position (P2). The disposition of this mechanism is such that, in the landing position (P3), a slot exists between the flap (18) and the leading edge, whereas this slot disappears in the take-off position (P2). The mechanism preferably includes two connection rods (28,30) connecting a control reversing lever (26) and an intermediate reversing lever (40).

13 Claims, 5 Drawing Sheets

RIGID KRUGER NOSE FOR THE LEADING EDGE OF AN AIRCRAFT WING

FIELD OF THE INVENTION

The invention concerns a rigid krÿger nose to be implanted on the leading edge of a wing of an aircraft, such as a jumbo-jet.

BACKGROUND OF THE INVENTION

For information, a krüger nose is a hypersupporting device in the shape of a flap which retracts during the flight so as to form an intrados or a lower side region of the leading edge of the wing. During taking-off or landing, this flap is deployed by a mechanism housed in the leading edge so as to increase lift by extending towards the front extrados or top surface of the wing.

Although this application does not need to be regarded as restrictive, the use of krüer noses on the leading edge of the wings of aircraft is particularly adapted to the case of hybrid laminar wings in which a layer suction system is placed on the top side of the leading edge. In fact, this technique requires that there is no irregularity on the extrados of the leading edge, which is precisely possible by using krüger noses as hypersupporting devices.

As illustrated in detail in the document U.S. Pat. No. 4,398,688, the latter describes krüger noses including rigid flaps, generally articulated, and deployed by means of a single pivoting around a fixed spindle.

However, these rigid krüger noses comprise either a single deployed position in which a slot may be provided between the flap and the leading edge, or several deployed positions without any slot.

Existing rigid krüger noses thus do not take into account certain contradictory requirements of the landing and take-off stages.

Thus, it is desirable in the landing phase to define an intermediate position in which the flaps of the krüger noses are orientated according to a clearly specific angle (about 65 degrees) with respect to the median plane of the wing and in which a slot with a specific width (for example about 1% of the cord of the wing) is formed between the flap and the leading edge. In fact, this configuration is favorable for obtaining a maximum lift level essential for this flight phase.

Moreover, in the extreme take-off position, which corresponds in this case to a specific orientation of the flaps of the krüger noses (for example about 30 degrees with respect to the median plane of the wing), it is on the other hand desirable that no slot exists between these flaps and the leading edge. In fact, the absence of any slot during take-off is generally favorable for good fineness of the wing and in addition is better able to protect the leading edge from any possible impacts (insects, dust, etc) by suppressing the separation line of the fixed leading edge. This absence of any slot is even more favorable in a laminar wing as the presence of several insects or dust remaining glued to the leading edge is likely to destroy the laminarity throughout the next flight phase, even if a cleaning system is provided.

As illustrated in detail in the document U.S. Pat. No. 3,743,219, there are also deformable krüger noses including a flap whose shape is modified by the mechanism, which ensures its deployment between its folded back position and its deployed position. The advantage of this conception is to enable the flap to be adapted to the shape of the lower profile of the wing when the flap is folded back and to the aerodynamic requirements when the flap is deployed.

Furthermore, the document U.S. Pat. No. 3,743,219 describes a krüger nose whose deployment mechanism makes the flap move through an intermediate landing position in which a slot is formed between the flap and the leading edge before reaching the fully deployed take-off position in which there is no slot between the flap and the leading edge.

However, the mechanism ensuring deployment of the flap and the ensuing kinematics are complicated by the deformable nature of the flap.

In addition, the de-icing of these deformable flaps has to be effected via the blowing of hot air from the leading edge of the wing. If this wing has a laminar profile, which assumes as seen that suction is carried out on the top surface or extrados of the leading edge, this particular solution cannot in practice be used.

SUMMARY OF THE INVENTION

The invention provides an original krüger nose able to be used on all types of wing but in particular adapted to laminar wings and comprising a rigid flap which is easy to device and controlled by a particularly simple mechanism suitable for defining, not only the specific extreme flight and take-off positions, but also at least one specific intermediate position such as a landing position.

In accordance with the invention, this result is obtained by using a krüger nose for the leading edge of an aircraft wing and including a flap and a movement control mechanism connecting the flap to a control member housed in the leading edge of the wing, an activation of this movement control mechanism controlled by the control member making the flap move from a retracted flight position in which this flap forms a lower surface region of the leading edge to at least one intermediate position in which there is a slot between the flap and the leading edge and into a deployed take-off position in which this slot disappears completely, characterized by the fact that the flap is a rigid flap.

According to one first embodiment of the invention, the rigid flap is joined by a first spindle to an element, such as an intermediate reversing lever of the movement control mechanism joined by a second spindle to a fixed internal structure of the leading edge, this movement control mechanism further including means to make the rigid flap rotate mainly around the first spindle close to the flight position and mainly around the second spindle close to the take-off position.

The second spindle is then situated in the leading edge and preferably close to the front extremity of the top side region formed by the flap in the flight position, and the first spindle is situated in front of and above the second spindle when the flap is in the flight position and behind and above the second spindle when the flap is in the take-off position.

The means for rotating the rigid flap advantageously include a control reversing lever integral with a drive pin constituting the control member, a first connection rod joined by a third spindle to the intermediate element and by a fourth spindle to the control reversing lever and a second connection rod joined by a fifth spindle to the rigid flap and by a sixth spindle to the control reversing lever.

When the flap is in the flight position, the fourth spindle is placed between the third spindle and the drive pin slightly above a plane containing the latter. In this way, the rotation of the control reversing lever corresponding to the deployment of the rigid flap has the effect of making the mechanism pass through a neutral position, which enables the rigid flap to mainly rotate around the first spindle close to the flight position.

In this first embodiment of the invention, the sixth spindle is preferably situated above the drive pin when the flap is in the flight position and in front of this drive pin when the flap is in the take-off position, whereas the first spindle remains permanently situated above a plane containing the fifth and sixth spindles.

In addition, the control reversing lever is housed in the leading edge behind the flap when the latter is in the flight position.

According to a second embodiment of the invention, the movement control mechanism includes a first connection rod and a second connection rod respectively joined to the rigid flap by a first spindle and a second spindle and to a fixed internal structure of the leading edge by a drive pin constituting the control member and by a third spindle.

In this case, the drive pin and the third spindle are preferably situated in the leading edge close to the front extremity of the top surface region formed by the flap in the flight position, the first and second spindles being offset towards the rear with respect to this drive pin and a third spindle, and vertically with respect to each other when the flap is in the flight position.

According to a variant applicable to the two embodiments of the invention, a deflecting nose is joined to the rear extremity of the rigid flap in the flight position and folded back inside the leading edge in this flight position, an annexed mechanism connecting this deflecting nose to the movement control mechanism so as to automatically deploy this deflecting nose when the flap is in the take-off position and the intermediate position.

BRIEF DESCRIPTION OF THE DRAWINGS

There now follows non-restrictive examples of two embodiments of the invention, as well as two variants, with reference to the accompanying drawings on which.

DETAILED DESCRIPTION OF THE PREFERRED EMBODIMENTS

Figure 1:
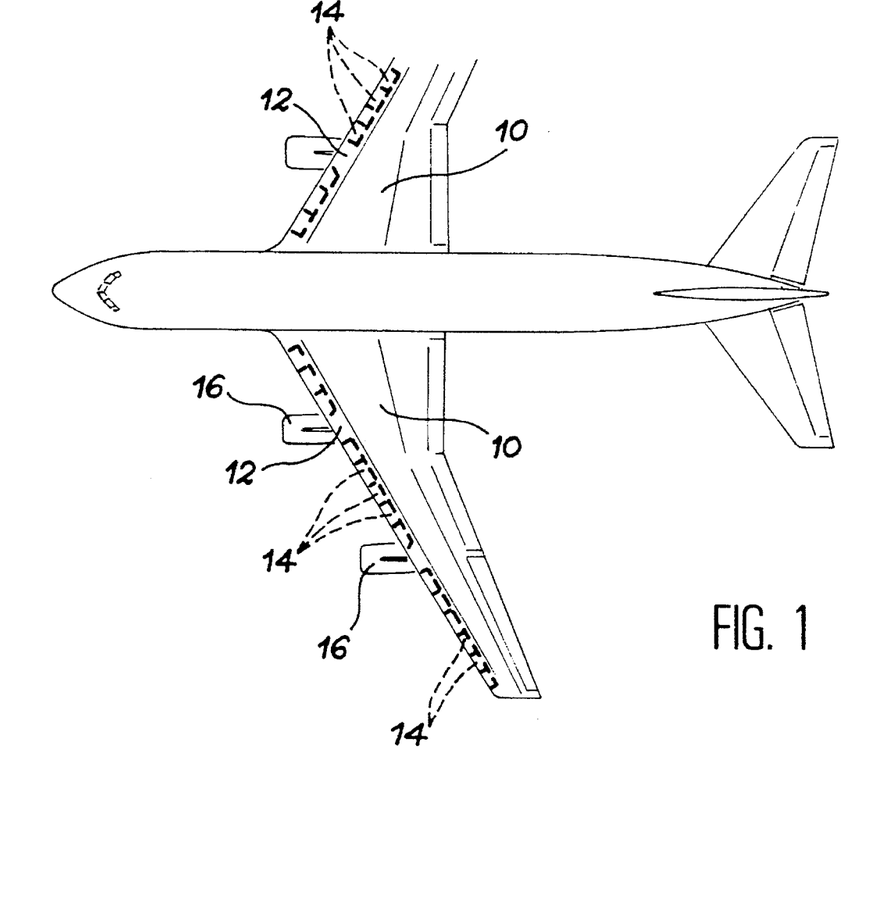
FIG. 1 is a top view of an aircraft whose wing is equipped on its leading edge with rigid krüger noses conforming to the invention.

FIG. 1 partially and approximately shows a jumbo-jet whose wing 10 comprises on its leading edge 12 hypersupporting devices constituted by rigid krüger noses 14. The krüger noses are conventionally distributed over the entire length of the leading edge 12, except for the vertical line of the engines 16.

Figure 2:
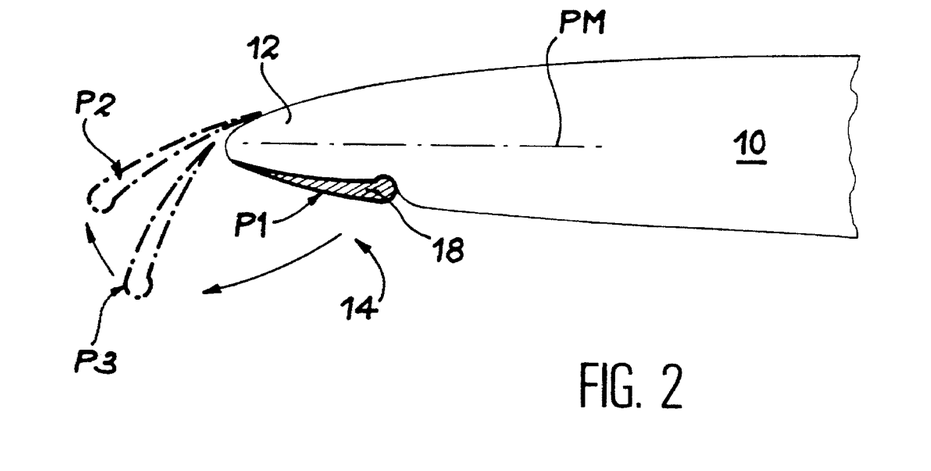
FIG. 2 is a diagrammatic cutaway view on larger scale representing the three main positions taken up by the rigid krüger nose according to the flight configurations of the aircraft.

As diagramatically shown on FIG. 2, each of the rigid krüger noses 14 comprises a rigid flap 18 which in flight normally occupies a retracted flight position P1 in which this flap 18 forms a lower surface region of the leading edge 12 of the wing.

In a take-off position P2, the rigid flap 18 is, on the other hand, fully deployed towards the front so that its outer surface extends towards the front the upper surface of the wing and so that there is no slot between the flap 18 and the leading edge 12. In this take-off position, the flap 18 forms, along with the median plane PM of the wing 10, an angle approximately equal to 30 degrees.

FIG. 2 also shows an intermediate position P3 of the rigid flap 18 which corresponds to the position given to this flap at the moment the aircraft is landing. In this intermediate position P3, the flap 18 is orientated towards the front and downwards from the leading edge 12 of the wing and a slot is formed between the flap and this leading edge.

More specifically, the flap 18, together with the median plane PM of the wing 10, forms an angle of about 65 degrees and the slot formed between the flap and the leading edge is equal to about 1% of the cord of the wing.

Figure 3A:
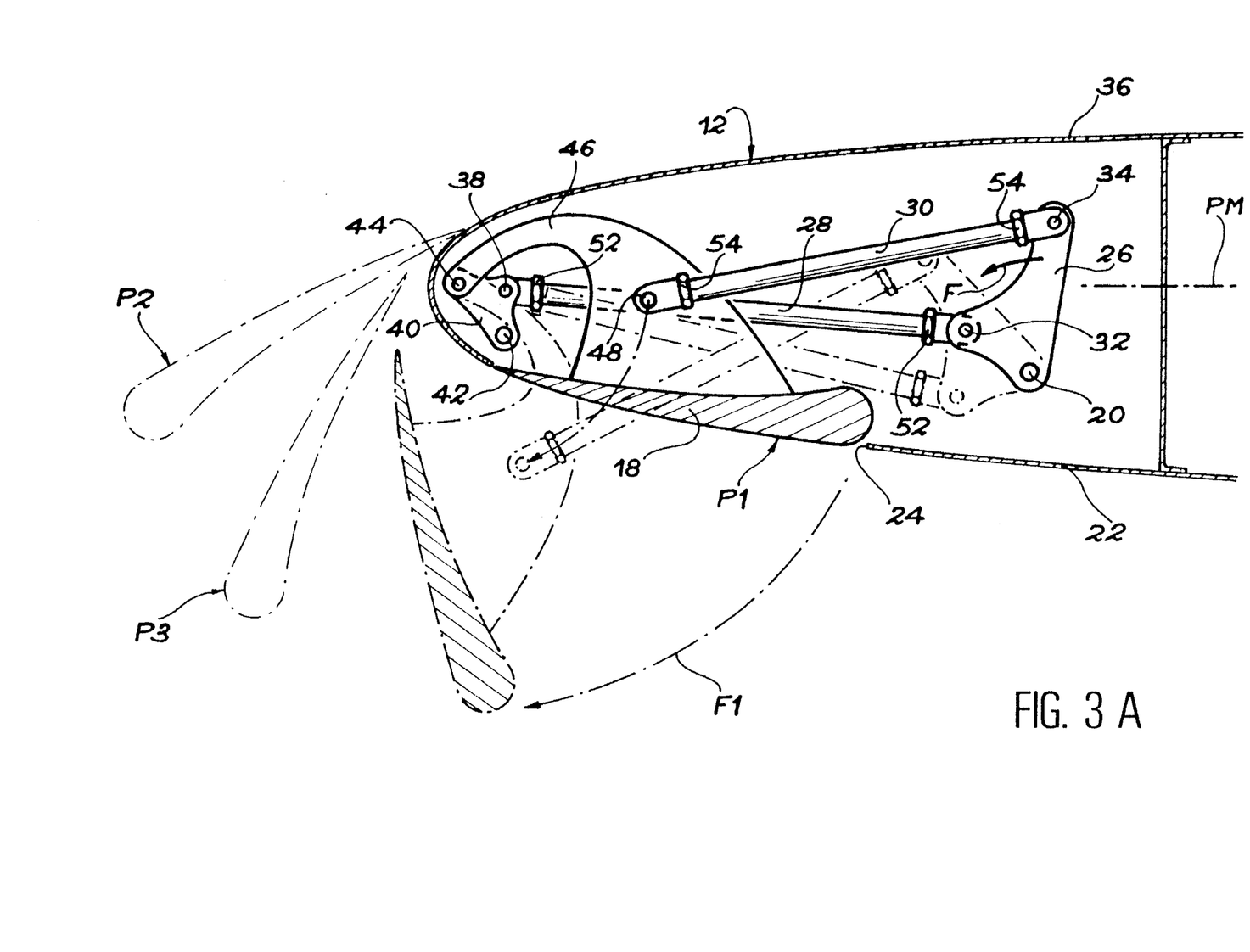
FIG. 3A is a cutaway view on larger scale of the leading edge of the wing illustrating one first embodiment of the rigid krüger nose of the invention, the flap being represented by the full line in its folded back flight position and by the dot-and-dash lines in one first slightly deployed intermediate position.

There now follows a detailed description of a preferred embodiment of the rigid krüger nose of the invention with reference to FIG. 3A.

As shown on FIG. 3A, the rigid krüger nose 14 includes, in addition to the rigid flap 18, a movement control mechanism connecting this rigid flap 18 to a control member constituted by a drive pin 20 housed in the leading edge 123 of the wing and orientated along a transverse direction with respect to the aircraft. More specifically, the drive pin 20 is situated at approximately an equal distance from the lower surface casing 22 of the leading edge 12 of the wing and the median plane PM of the latter and behind an opening 24 made in the lower surface casing 22 so as to enable the rigid flap 18 to be housed. The members controlling rotation of the drive pin 20 do not form part of the invention.

The movement control mechanism inserted between the drive pin 20 and the rigid flap 18 includes a control reversing lever 26 integral with the drive pin 20 and which has in the embodiment shown on FIG. 3A approximately the shape of a triangle. Irrespective of the position it occupies, the reversing lever 26 is situated behind the opening 24 in which the rigid flap 18 to be housed is in a flight position.

The movement control mechanism moreover includes two crossed connection rods 28 and 30 both joined by one of their extremities to the control reversing lever 267 by means of two spindles 32 and 34 respectively.

Figure 3B:
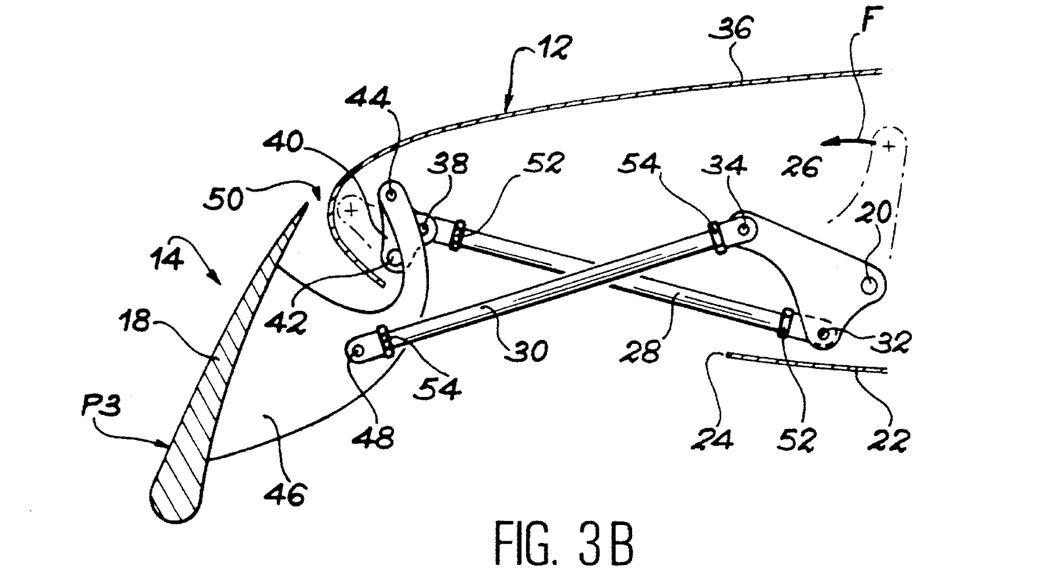
FIGS. 3B and 3C are views similar to that on FIG. 3A illustrating the rigid krüger nose respectively in its intermediate landing position and in its fully deployed takeoff position.
Figure 3C:
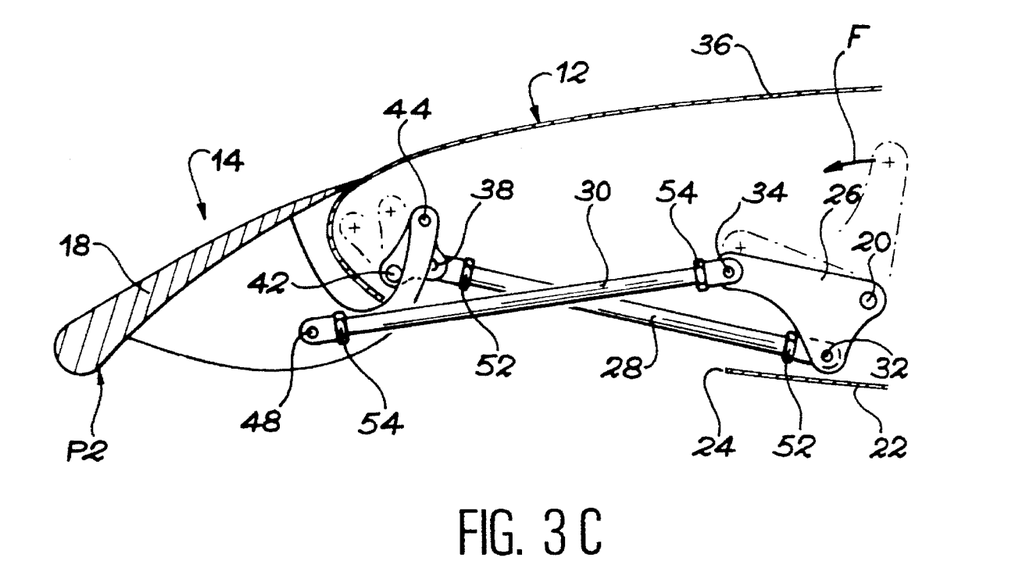

As shown on FIGS. 3A to 3C, the spindles 32 and 34 are parallel to the drive pin 20 and the distance separating the spindle 34 from the drive pin 20 is approximately twice the distance separating the spindle 32 from the drive pin 20.

In the position of the control reversing lever 26 corresponding to the retracted flight position of the rigid flap 18 illustrated by the full line on FIG. 3A, the spindle 32 by which the connection rod 28 is joined to the reversing lever 26 is offset towards the front and upwards with respect to the drive pin 20. The spindle 34 by which the connection rod 30 is joined to the control reversing lever 26 is then situated above the drive pin 20 and slightly offset towards the rear with respect to the latter. In these circumstances, the spindle 34 is then approximately situated at an equal distance from the upper surface casing 36 of the leading edge 12 and the median plane Pm of the wing.

At its opposing extremity, the connection rod 28 is joined by a spindle 38 to an intermediate reversing lever 40 housed in the front portion of the leading edge 12. The intermediate reversing lever 40, constituted by an approximately triangular element in the embodiment diagrammatized on FIGS. 3A to 3C, is joined to the internal structure of the leading edge 12 by a fixed spindle 42 situated above and immediately close to the front extremity of the opening 24 made in the lower surface casing of the leading edge so as to receive the rigid flap 18. The intermediate reversing lever 40 is also joined by a third spindle 44 to the narrow extremity of a swan neck-shaped element 46 whose wider extremity is secured to the internal face of the rigid flap 18. The intermediate reversing lever 40 is able to complete the movement control mechanism inserted between the drive pin 20 and the rigid flap 18.

The distance separating the spindle 44 from the fixed spindle 42 is close to the distance separating the spindle 32 from the drive pin 20 on the control reversing lever 26. On the other hand, the spindle 38 is closer to the fixed spindle 42 than the spindle 44, the distance between the spindles 38 and 42 being slightly greater than half the distance separating the spindles 44 and 42.

In the position of the intermediate reversing lever 40 corresponding to the retracted flight position of the rigid flap 18 shown by the full line on FIG. 3A, the spindle 44 is situated above and in front of the fixed spindle 42. The spindle 38 is situated above the spindle 42 and virtually on the vertical line of the latter.

So as to complete the movement control mechanism connecting the drive pin 20 to the rigid flap 20, it can be observed on FIGS. 3A to 3C that the extremity of the connection rod 30 opposite the control reversing lever 26 is directly joined to the swan neck-shaped element 46 by a spindle 48. Like the spindles 38, 42 and 44, this spindle 48 is parallel to the drive pin 20.

When the various elements of the movement control mechanism are in their positions corresponding to the retracted flight position of the rigid flap 18 shown on FIG. 3A, the hinge pin 32 of the connection rod 28 on the control reversing lever 26 is situated slightly above a plane passing through the drive pin 20 and the hinge pin 38 of the connection rod 28 on the intermediate reversing lever 40. Accordingly, an anticlockwise rotation of the control reversing lever 26 on FIG. 3A (arrow F) firstly approaches the spindle 32 of this plane, which is expressed by an imperceptible rotation of the intermediate reversing lever 40 in the same direction around its fixed spindle 42. After a neutral position corresponding to the moment when the spindle 42 is located in the plane of the spindles 20 and 38, the rotation movement of the intermediate reversing lever 40 around the fixed spindle 42 is inverted whilst momentarily remaining with an extremely low amplitude.

Furthermore, when the flap 18 is in the retracted flight position, the plane passing through the hinge pins 34 and 48 of the connection rod 30 moves slightly below the hinge pin 44 of the swan neck-shaped element 46, and this plane, along with a plane passing through the spindles 20 and 34, forms an acute angle close to 90 degrees. Accordingly, a rotation of the control reversing lever 26 in the direction of the arrow F from its position corresponding to closing of the flap 18 results in a high amplitude pivoting clockwise movement of the rigid flap 18 around the hinge pin 44 (arrow F1).

During the first phase of the deployment movement of the rigid flap 18 shown on FIG. 3A, the intermediate reversing lever 40 thus remains virtually stationary and the rigid flap 18 borne by the swan neck-shaped element 46 pivots around a fixed hinge pin 44.

In a second phase for deployment of the rigid flap 18 shown on FIG. 3B, the rotation of the control reversing lever 26 in the direction of the arrow F controls, by means of similar amplitude pivoting movements, the clockwise rotation of the intermediate reversing lever 40 around its fixed spindle 42 and the clockwise rotation of the swan neck-shaped element 46 bearing the rigid flap 18 around the hinge pin 44. This double movement makes it possible to reach the position P3 illustrated on FIG. 3b, which corresponds to the position occupied by the rigid flap 18 on landing in which a slot 50 with a fully controlled width (equal, for example, to about 1% of the cord of the wing) is formed between the rigid flap 18 and the leading edge 12 of the wing.

This intermediate landing position P3 is obtained for a clearly determined pivoting of the control reversing lever 26 in the direction of the arrow F (for example about 75 degrees) which may be easily indexed.

When rotation of the control reversing lever 26 in the direction of the arrow F is continued under the action of the drive pin 20, the spindle 34 moves along a direction almost perpendicular to the plane passing through the spindles 20 and 48, whereas the spindle 32 moves along a direction almost parallel to the plane containing the spindles 20 and 38. Accordingly, this terminal phase for the deployment movement of the rigid flap 18 is characterized by an almost absence of any rotation of the element 46 bearing the rigid flap 18 around the spindle 44, whereas on the contrary the pivoting of the intermediate reversing lever 40 around the spindle 42 is accentuated. The pivoting axis of the rigid flap 18 then is virtually merged with the fixed spindle 42, which has the effect of reclosing the slot 50 which disappears completely, as shown on FIG. 3C, in the take-off position P2 of the rigid flap 18 corresponding to the full deployment of the latter. This position also corresponds to a clearly determined pivoting of the control reversing lever 26 (for example, about 90 degrees with respect to its initial position) in the direction of the arrow F, which can be easily indexed.

As shown on FIGS. 3A to 3C, each of the connection rods 28 and 30 is equipped with length adjustment means 52 and 54 by virtue of which a fine adjustment of the various positions taken up by the flap 18 is able to be made. In fact, the preceding description shows that the connection rod 28 is used to control the pivoting of the intermediate reversing lever 40 around the fixed spindle 42 and accordingly the width of the slot 50, whereas the connection rod 30 is used to control the pivoting of the element 46 bearing the flap 18 and thus the orientation of the latter.

Figure 4:
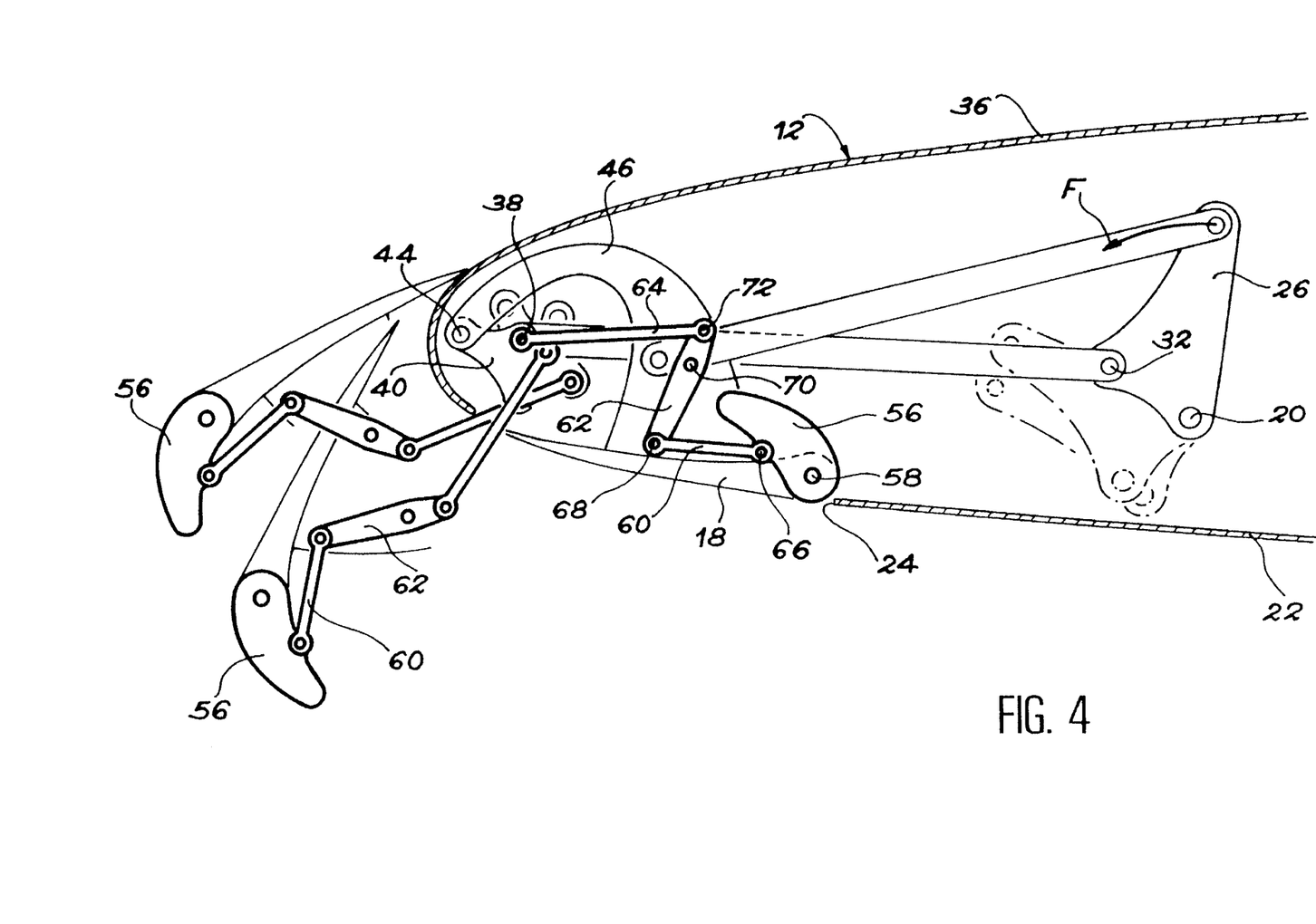
FIG. 4 is a view similar to those on FIGS. 3A to 3C illustrating one variant of the first embodiment of the invention, the krüger nose being represented in its folded back flight position, its intermediate landing position and in its fully deployed take-off position.

FIG. 4 shows a variant of the embodiment just described with reference to FIGS. 3A to 3C. In this variant, the rigid krüger nose includes all the elements described earlier, additional elements being added to the latter. These additional elements are mainly constituted by a deflecting nose 56 joined to the extremity of the rigid flap 18, and an annexed mechanism making it possible to deploy this deflecting nose at the time the rigid flap 18 is deployed.

As shown in detail on FIG. 4, the deflecting nose 56 is joined by a spindle 58 to the extremity of the rigid flap 18 which is orientated towards the rear when this flap is in the retracted flight position. In this position, the deflecting nose 56 is fully housed inside the leading edge 12 and is folded back upwards and forwards on the rigid flap 18 so that the dimensions of the opening 24 remain virtually unchanged.

The annexed mechanism ensuring the deployment of the deflecting nose 56 during deployment of the rigid flap 18 includes three connection rods 60, 62 and 64 joined together to form a Z, as shown on FIG. 4.

More specifically, one first extremity of the connection rod 60 is joined to the deflecting nose 56 by a spindle 66 and the opposing extremity of this connection rod 60 is joined to a first extremity of the connection rod 62 by a spindle 68.

In its central portion, the connection rod 62 is joined to the swan neck-shaped element 46 by a spindle 70, whereas its extremity opposite the spindle 68 is joined to a first extremity of the connection rod 64 by a spindle 72. Finally, the opposing extremity of the connection rod 64 is joined to the intermediate reversing lever 40 by the spindle 38.

Like all the other spindles of the mechanism, the spindles 58, 66, 68, 70 and 72 are parallel to the drive pin 20.

The lengths of the connection rods 60 and 62 are roughly identical, whereas the connection rod 64 is approximately longer. In addition, the pivoting axis of the intermediate connection rod 62 on the swan neck-shaped element 46 is approximately closer to the spindle 72 than the spindle 68.

In the retracted flight position of the rigid flap 178, the spindle 70 is situated close to the plane passing through the spindles 32 and 38, and the connection rod 62, along with each of the connection rods 60 and 64, form acute angles (for example about 60 degrees).

During deployment of the rigid flap 18 controlled by a rotation of the control reversing lever 26 in the direction of the arrow F, the rotation of the swan neck-shaped element 46 clockwise around the spindle 44, which occurs in the first part of the movement, is, following a dead time enabling the flap 18 bearing the rigid nose 56 to come out of the opening 24, expressed by an increase of the distance separating the spindles 38 and 70. Under the effect of this distance increase, the angle formed between the connection rods 64 and 70 progressively opens in the same way as the angle formed between the connection rods 60 and 62. Accordingly, the deflecting nose 56 is progressively deployed by pivoting clockwise around its hinge pin 58.

It is to be noted that this deployed position of the deflecting nose 56 remains virtually unchanged between the intermediate landing position and the extreme take-off position due to the fact that between these two positions, there is hardly any relative rotation between the swan neck-shaped element 46 and the intermediate reversing lever 40.

Figure 5:
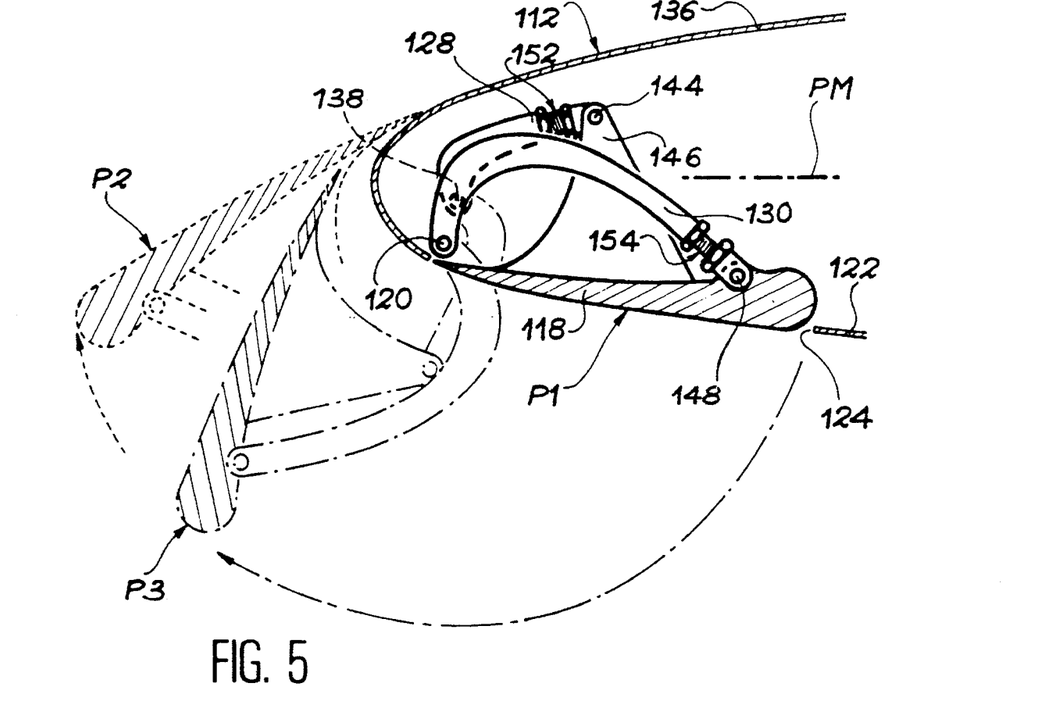
FIG. 5 is a cutaway view similar to those on FIGS. 3A to 3C illustrating a second embodiment of the invention, the krüger nose being here represented in its three normal operating positions.

With reference to FIG. 5, there now follows a description of a second embodiment of the invention in which the movement control mechanism connecting the rigid flap to its drive pin is simplified. However, it is to be noted that this solution is less satisfactory than the preceding one as it requires using forces much more significant than in the first embodiment. For the purpose of simplification, the elements identical or similar to those of the first embodiment of the invention are denoted by the same reference figures but increased by 100.

In this second embodiment of the invention, the movement control mechanism connecting the rigid flap 118 to the drive pin 120 mainly includes two connection rods 128 and 130 which mainly act in the way of a deformable parallelogram.

The connection rod 128 is joined around a fixed spindle inside the leading edge 112 of the wing at one of its extremities and its opposing extremity is joined by a spindle 144 to the narrow extremity of a swan neck-shaped element 146 whose wider extremity is integral with the internal face of the rigid flap 118.

The connection rod 130 is integral with the drive pin 120 at one of its extremities and joined directly to the internal face of the rigid flap 118 by a spindle 148.

More specifically, the drive pin 120 is situated in this instance immediately close to the front edge of the opening 124 formed in the intrados casing 122 of the leading edge 112 and the spindle 138 is situated above this drive pin 120 close to the median plane PM of the wing and slightly offset towards the rear with respect to the drive pin 120.

Furthermore, the spindle 148 is situated close to the extremity of the rigid flap 118 orientated towards the rear when this flap occupies its retracted flight position. In addition, the distance between the spindles 120 and 148 is approximately greater than the distance between the spindles 138 and 144. Finally, the spindle 144 is situated approximately at an equal distance from the drive pin 120 and the spindle 148 and is located between the extrados casing 136 of the leading edge 112 and the median plane PM of the wing when the rigid flap 118 occupies its retracted flight position shown by the full line on FIG. 5.

In the disposition described above, the clockwise rotation of the drive pin 120 has the effect of deploying the rigid flap 118 so as to successively bring it into the intermediate landing position P3 and then into the take-off position P2, these positions being similar to the positions obtained in the first embodiment of the invention. As earlier, the connection rod 130 mainly controls the orientation of the flap, whereas the connection rod 128 controls the width of the slot between the flap and the leading edge.

As in the first embodiment, the connection rods 128 and 130 are advantageously equipped with length adjustment means 152, 154.

Figure 6:
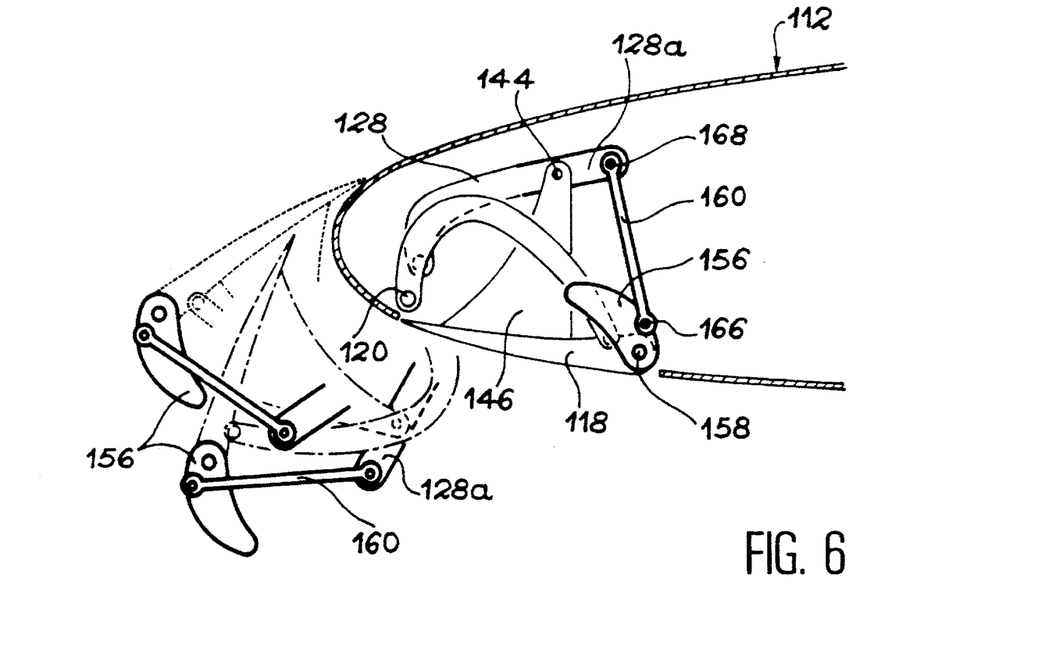
FIG. 6 is a cutaway view similar to that of FIG. 4 illustrating a variant of the second embodiment of the invention and in its three operating positions.

FIG. 6 shows one variant of the embodiment of FIG. 5 and similar to the variant of FIG. 4 for the embodiment of FIGS. 3A to 3C.

More specifically, in this variant of FIG. 6, the rigid krüger nose comprises all the elements previously described with reference to FIG. 5 and additional elements constituted by a deflecting nose 156 joined to the rigid flap 118 and by a mechanism enabling this deflecting nose to move when deploying the rigid flap 118.

More specifically, the deflecting nose 156 is joined by a spindle 158 to the extremity of the rigid flap 118 orientated towards the rear when the flap occupies its retracted flight position. The deflecting nose 156 is then folded back forwards and towards the inside of the leading edge 112 in a similar way to that described for the deflecting nose 56 in the variant of FIG. 4.

The annexed mechanism used to control deploying the deflecting nose 156 when deploying the rigid flap 118 mainly includes a connection rod 160 with one extremity being joined to the deflecting nose 156 by a spindle 166 and its opposing extremity being joined to the extremity of an elongation 128a of the connection rod 128 by a spindle 168. The spindles 166 and 168, in the same way as the spindle 158, are parallel to the drive pin 120.

The elongation 128a to which the connection rod 160 is joined extends the connection rod 128 beyond the spindle 144 by which the latter is joined to the swan neck-shaped element 146. The spindle 166 is situated above the spindle 158 and slightly offset towards the rear with respect to the latter, whereas the spindle 168 is situated above and slightly offset towards the front with respect to this same spindle 158 when the rigid flap 118 occupies its retracted flight position.

As shown by the dot-and-dash lines on FIG. 6, the rotation of the drive pin 120 which controls deployment of the rigid flap 118, either into its intermediate landing position or into its deployed take-off position, simultaneously controls by means of the connection rod 160 the deployment of the deflecting nose 156 via a rotation of this nose clockwise around its spindle 158.

As regards the various embodiments of the invention, it is to be noted that the rigid krüger nose is able to release inside the leading edge 12 or 112 a suction zone extending over the entire extrados casing 36 or 136 of the wing as far as the front extremity of the leading edge. This disposition makes it possible to equip the wing with a limit layer suction system able to render the wing laminar.

Furthermore, the rigid nature of the flap 18 or 118 allows it to be internally equipped with de-icing means constituted, for example, by a cavity in which a hot fluid circulates and able to be injected by means of flexible pipes taking into account the movement of the rigid flap between its various positions.

What is claimed is:

1. A Krüger nose for deployment over the leading edge of an aircraft wing comprising a rigid flap, a control member housed in the leading edge of the aircraft wing with said rigid flap being responsive to the position of the control member for assuming at least three different positions including a retracted flight position in which the flap forms an intrados region of the leading edge, at least one intermediate position in which a slot is formed between the flap and the leading edge, and a deployed take-off position in which there is no slot between the flap and the leading edge and a movement control mechanism interconnecting the flap and said control member so as to move the flap into anyone of said different positions.

2. A Krüger nose as defined in claim 1, wherein said movement control mechanism includes at least a first and second spindle and means coupling said rigid-flap to said first and second spindle and to said control member such that said rigid flap is rotatable about said first spindle when said flap is close to or in said retracted position and is rotatable about said second spindle when said flap is close to or in said take-off position.

3. Krüger nose according to claim 2, wherein the second spindle is situated inside the leading edge close to the front extremity of the intrados region formed by the flap in the flight position and wherein the first spindle is situated in front of and above the second spindle when the flap is in a flight position and behind and above the second spindle when the flap is in the take-off position.

4. Krüger nose according to claim 2, wherein the means for rotating the rigid flap include a control reversing lever integral with a drive pin constituting the control member, a first connection rod joined by a third spindle to the intermediate element and by a fourth spindle to the control reversing lever, and a second connection rod joined by a fifth spindle to the rigid flap and by a sixth spindle to the control reversing lever.

5. Krüger nose according to claim 4, wherein, when the flap is in a flight position, the fourth spindle is placed between the third spindle and the drive pin slightly above a plane containing the latter two spindles.

6. Krüger nose according to claim 4, wherein the sixth spindle is situated above the drive pin when the flap is in a flight position and in front of the drive pin when the flap is in a take-off position, whereas the first spindle remains situated permanently above a plane containing the fifth and sixth spindles.

7. Krüger nose according to claim 4, wherein the control reversing lever is housed in the leading edge behind the flap in its flight position.

8. Krüger nose according to claim 4, wherein the rigid flap is integral with a swan neck-shaped element with one extremity being joined to the intermediate element by the first spindle.

9. Krüger nose according to claim 1, wherein the movement control mechanism includes a first connection rod and a second connection rod respectively joined to the rigid flap by one first spindle and one second spindle, and to a fixed internal structure of the leading edge by a drive pin constituting the control member and by a third spindle.

10. Krüger nose according to claim 9, wherein the drive pin and the third spindle are situated in the leading edge close to the front extremity of the intrados region formed by the flap in its flight position, the first and second spindles being offset towards the rear with respect to this drive pin and this third spindle, and vertically with respect to one another when the flap is in its flight position.

11. Krüger nose according to claim 1, wherein a deflecting nose is joined to the rear extremity of the rigid flap in its flight position and folded back inside the leading edge in this flight position, an annexed mechanism connecting this deflecting nose to the movement control mechanism when the flap is in a take-off position and in an intermediate position.

12. Krüger nose according to claim 4, wherein the connection rods include length adjustment means.

13. A Krüger nose for deployment over the leading edge of an aircraft wing comprising a rigid flap, a control member housed in the leading edge of the aircraft wing below the median plane thereof with said rigid flap being responsive to the position of the control member for assuming at least three different positions including a retracted flight position in which the flap forms an intrados region of the leading edge, at least one intermediate position in which a slot is formed between the flap and the leading edge, and a deployed take-off position in which there is no slot between the flap and the leading edge and a movement control mechanism interconnecting the flap and said control member so as to move the flap into anyone of said different positions.

* * * * *